US012596894B2

(12) United States Patent
Blair et al.

(10) Patent No.: US 12,596,894 B2
(45) **Date of Patent: *Apr. 7, 2026**

(54) MUTING CIRCUIT FOR ANALOG FILTERS IN RADIO FREQUENCY IDENTIFICATION (RFID) SYSTEMS

(71) Applicant: Avid Identification Systems, Inc., Norco, CA (US)

(72) Inventors: Mark Blair, Riverside, CA (US); Martin S. H. Ma, Foothill Ranch, CA (US)

(73) Assignee: AVID Identification Systems, Inc., Norco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/444,610

(22) Filed: Feb. 16, 2024

(65) Prior Publication Data

US 2025/0013838 A1 Jan. 9, 2025

Related U.S. Application Data

(63) Continuation of application No. 17/164,818, filed on Feb. 1, 2021, now Pat. No. 11,907,794, which is a continuation of application No. 16/857,046, filed on Apr. 23, 2020, now Pat. No. 10,915,717.

(51) Int. Cl.
*G06K 7/10* (2006.01)

(52) U.S. Cl.
CPC ..... *G06K 7/10316* (2013.01); *G06K 7/10227* (2013.01)

(58) Field of Classification Search
CPC ........... G06K 7/10297; G06K 7/10316; G06K 7/10227; G06K 7/10009; G06K 7/0008; H04B 1/40
See application file for complete search history.

(56) References Cited

U.S. PATENT DOCUMENTS

| | | | |
|---|---|---|---|
| 4,926,185 A | 5/1990 | Wittenberg | |
| 5,311,100 A | 5/1994 | Brain | |
| 5,450,622 A | 9/1995 | Vandegraaf | |
| 6,362,738 B1 | 3/2002 | Vega | |

(Continued)

FOREIGN PATENT DOCUMENTS

| | | |
|---|---|---|
| CN | 101640546 | 2/2010 |
| CN | 105279543 A | 1/2016 |

(Continued)

OTHER PUBLICATIONS

Extended European Search Report in European Appln No. 21792137.8, dated Sep. 28, 2023, 10 pages.

(Continued)

*Primary Examiner* — Yong Hang Jiang
(74) *Attorney, Agent, or Firm* — Fish & Richardson P.C.

(57) ABSTRACT

An apparatus, which allows a radio frequency identification (RFID) reader to recover quickly from transient input to its receiving subsystem when transitioning from writing to an RFID transponder to reading its response. In particular, this apparatus is comprised of muting circuits, which both attenuate transients in its receiving subsystem while writing to a transponder, and help the receiving subsystem settle quickly after experiencing such transients.

18 Claims, 5 Drawing Sheets

(56) References Cited

U.S. PATENT DOCUMENTS

| | | | | |
|---|---|---|---|---|
| 6,864,800 | B2 | 3/2005 | Leichtfried et al. | |
| 7,183,926 | B2 * | 2/2007 | Diorio | G06K 19/0723 |
| | | | | 455/266 |
| 7,212,116 | B2 * | 5/2007 | Wang | H04B 7/0848 |
| | | | | 340/568.1 |
| 10,530,314 | B2 | 1/2020 | Medra et al. | |
| 10,601,655 | B2 | 3/2020 | Hou et al. | |
| 2002/0142790 | A1 | 10/2002 | Samelis et al. | |
| 2003/0017815 | A1 | 1/2003 | Spriegel | |
| 2003/0057279 | A1 | 3/2003 | Uozumi et al. | |
| 2005/0084003 | A1 | 4/2005 | Duron et al. | |
| 2005/0161508 | A1 * | 7/2005 | Akaida | G06K 7/0008 |
| | | | | 235/451 |
| 2005/0231367 | A1 * | 10/2005 | Bellantoni | G06K 7/0008 |
| | | | | 340/572.1 |
| 2006/0178111 | A1 | 8/2006 | Choi et al. | |
| 2007/0046434 | A1 | 3/2007 | Chakraborty | |
| 2007/0109101 | A1 | 5/2007 | Colby | |
| 2007/0206705 | A1 * | 9/2007 | Stewart | H04B 1/59 |
| | | | | 375/316 |
| 2009/0207037 | A1 | 8/2009 | Wiberg et al. | |
| 2012/0006905 | A1 | 1/2012 | Watanabe et al. | |
| 2012/0051411 | A1 | 3/2012 | Duron et al. | |
| 2012/0063496 | A1 * | 3/2012 | Giannini | H03F 3/24 |
| | | | | 375/221 |
| 2012/0281550 | A1 * | 11/2012 | Huang | H04L 27/364 |
| | | | | 370/249 |
| 2019/0215203 | A1 | 7/2019 | Zoescher et al. | |
| 2020/0169298 | A1 | 5/2020 | Smirnov | |

FOREIGN PATENT DOCUMENTS

| | | |
|---|---|---|
| CN | 106506421 | 3/2017 |
| CN | 107808187 | 3/2018 |
| CN | 110521127 | 11/2019 |
| JP | 2005242989 A | 9/2005 |
| JP | 2011145836 A | 7/2011 |
| JP | 6233601 | 11/2017 |

OTHER PUBLICATIONS

International Preliminary Report on Patentability in International Appln. No. PCT/US2021/028138, mailed on Nov. 3, 2022, 7 pages.
International Search Report and Written Opinion in International Appln. No. PCT/US2021/028138, mailed on Aug. 6, 2021, 11 pages.

* cited by examiner

Circuit Behavior With Muting

322

325

Carrier Keying

523

527

529

Demodulator Input

524

528

530

Demodulated Bits

Time [ms]

MUTING CIRCUIT FOR ANALOG FILTERS IN RADIO FREQUENCY IDENTIFICATION (RFID) SYSTEMS

CROSS-REFERENCE TO RELATED APPLICATIONS

This application is a continuation of, and claims priority to, U.S. patent application Ser. No. 17/164,818, filed Feb. 1, 2021, which is a continuation of U.S. patent application Ser. No. 16/857,046, filed Apr. 23, 2020, the entire contents of each of which are incorporated herein by reference.

BACKGROUND

This specification relates to Radio Frequency Identification (RFID) systems, and in particular to magnetically-coupled passive RFID systems.

As shown in FIG. 1, passive RFID systems typically include two major subassemblies: an RFID reader, and an RFID transponder which is to be read at some distance from the RFID reader. The RFID reader includes an AC voltage source that drives its resonant antenna coil circuit. In this manner, the RFID reader emits an alternating magnetic field from its antenna coil, which is weakly magnetically coupled (represented in FIG. 1 by a dashed double arrow) to a corresponding antenna coil in the transponder to be read. Each of these antenna coils is part of a corresponding antenna coil circuit that includes one or more tuning capacitors to cause the corresponding antenna coil circuit to resonate at a desired frequency.

The transponder obtains its operating power from the RFID reader's emitted magnetic field, and modulates (e.g., using a switch and loading resistor) the Q factor and/or resonant frequency of its antenna coil circuit in a pattern corresponding to any information which is to be sent from the transponder to the RFID reader. This information commonly includes an identification number that uniquely corresponds to the individual transponder.

Due to the magnetic coupling between the RFID reader and the transponder, the transponder's modulation appears as variations in the electrical currents and voltages present in the RFID reader's antenna coil circuit. The RFID reader can then use a receiving subsystem (represented by RX in FIG. 1) to detect and demodulate these variations in order to retrieve whatever information the transponder sends. This receiving subsystem typically includes an amplitude modulation detector and one or more filtering and/or gain stages. Maximum reading range is typically achieved when both the RFID reader's antenna coil circuit and the transponder's antenna coil circuit are tuned to resonate at the frequency of the RFID reader's AC voltage source, both antenna coils are oriented for optimal magnetic coupling, both antenna coil circuits have the highest practical Q factors, and the transponder modulates its Q factor as deeply as practical while still receiving enough power from the RFID reader for its circuitry to operate.

The information present in a transponder is typically stored in some form of nonvolatile memory. This memory may include a combination of factory-programmed and/or field-programmable memory locations. Some transponders may also generate and/or store dynamic information, such as a temperature transducer reading. Typically, the transponder will automatically send a subset of its stored information when it is activated by the magnetic field emitted from a nearby RFID reader.

Some transponders are not only readable, but are also writable. A compatible RFID reader can modulate its own emitted alternating magnetic field (e.g., by turning on and off the AC voltage source driving its resonant antenna coil circuit) in order to send commands and/or data to one of these transponders. This function is called "writing", as opposed to the previously described function of "reading". A device which performs both reading and writing functions is usually still generically referred to as a "RFID reader". Transponder writing may be used for purposes such as commanding the transponder to send a different collection of information than it automatically sends by default, for initial programming of the transponder at time of manufacture, for programming field-programmable memory locations, or for activating special transponder functions.

SUMMARY

When writing to an RFID transponder, it is often necessary for an RFID reader to send a command to the transponder, and then immediately listen for a response from the transponder. While the RFID reader is modulating its emitted magnetic field to send a command to the transponder, the demodulator portion of the RFID reader sees this modulation as an extremely strong signal, which is much stronger than the signal normally received from the transponder. This strong signal is likely to saturate the RFID reader's demodulation circuits. Worse yet, filters in the demodulation circuits may require a significant amount of time (i.e., relative to the time it takes to send a receive transmissions) to recover from this saturation, and this recovery may not complete in time for the RFID reader to demodulate successfully the transponder's response. This issue becomes more problematic when higher filter performance is desired in order to improve the RFID reader's transponder reading range. This situation forces a compromise between the RFID reader's transponder reading performance vs. its ability to write commands and data to transponders.

This specification describes a demodulator filter chain, which has high gain and narrow bandwidth in order to demodulate weak signals from transponders at extreme range, yet also can recover quickly from large transient inputs it will see while an RFID reader modulates its emitted magnetic field to write commands and data to a transponder.

In general, one innovative aspect of the subject matter described in this specification can be embodied in circuitry for communicating with a radio frequency identification (RFID) transponder. The circuitry includes an antenna circuit; and a receiving subsystem coupled with the antenna circuit. The receiving subsystem includes: a detector circuit configured to detect voltages present in the antenna circuit, a filter stage comprising a feedback loop, the filter stage configured to output variations of the detected voltages that are caused by transmissions to and from the RFID transponder, a microcontroller configured to demodulate the output variations as digital data received from the RFID transponder as part of the communications, and a first switch disposed between the detector circuit and the filter stage to decouple the filter stage from the detector circuit when the first switch is closed, and couple the filter stage with the detector circuit when the first switch is open. The microcontroller is configured to maintain the first switch closed during the transmissions to the RFID transponder, and open the first switch after a first time interval since the end of the transmissions to the RFID transponder, the first time interval corresponding to a settling time of the detector circuit.

The foregoing and other embodiments can each optionally include one or more of the following features, alone or in combination. In particular, one embodiment includes all the following features in combination.

In some implementations, the first switch includes a pair of cascaded transistors.

The microcontroller can be configured to (i) monitor, after the end of transmissions to the RFID transponder, an input of the filter stage to determine whether the detector circuit has settled, and (ii) establish a length of the first time interval based on a result of the determination whether the detector circuit has settled.

The receiving subsystem can further include a second switch disposed as part of the feedback loop of the filter stage to decrease resistance of the feedback loop when the second switch is closed, and to increase the resistance of the feedback loop when the second switch is open, the microcontroller can be configured to maintain the second switch closed during the transmissions to the RFID transponder, and open the second switch after a second time interval since the end of the first time interval, the second time interval corresponding to a settling time of the filter stage.

The filter stage can include an operational amplifier, and the second switch is connected to short the feedback loop of the operational amplifier, when the second switch is closed. The second switch can include a pair of cascaded transistors. The microcontroller can be configured to monitor, after the end of transmissions to the RFID transponder, an input of the filter stage to determine whether the detector circuit has settled, and establish a length of the first time interval based on a result of the determination whether the detector circuit has settled, and monitor, after the end of the first interval, an output of the filter stage to determine whether the filter stage has settled, and establish a length of the second time interval based on a result of the determination whether the filter stage has settled.

In some embodiments, the filter stage is a first filter stage and the receiving subsystem further includes: a second filter stage disposed between the first filter stage and the microcontroller, and a third switch disposed as part of the feedback loop of the second filter stage, wherein the microcontroller is configured to open the third switch after a third time interval since the end of the second time interval, the third time interval corresponding to a settling time of the second filter stage. The second filter stage can include an operational amplifier, and the third switch is connected to short the feedback loop of the operational amplifier, when the third switch is closed. The third switch can include a pair of cascaded transistors. In some embodiments, the microcontroller is configured to monitor, after the end of transmissions to the RFID transponder, an input of the filter stage to determine whether the detector circuit has settled, and establish a length of the first time interval based on a result of the determination whether the detector circuit has settled, and monitor, after the end of the first interval, an output of the first filter stage to determine whether the first filter stage has settled, and establish a length of the second time interval based on a result of the determination whether the first filter stage has settled, and monitor, after the end of the second interval, an output of the second filter stage to determine whether the second filter stage has settled, and establish a length of the third time interval based on a result of the determination whether the second filter stage has settled.

In general, another innovative aspect of the subject matter described in this specification can be embodied in a method for communicating with a radio frequency identification (RFID) transponder. The method includes: transmitting an RFID reader RF signal from an RFID reader; receiving, at an antenna circuit of the RFID reader, a transponder RF signal transmitted by the RFID transponder in response to the RFID reader RF signal; detecting, during the transmitting and receiving and using a detector circuit of the RFID reader, voltages present in the antenna circuit; after a first time interval since an end of transmitting the RFID reader RF signal, coupling a filter stage to the detector circuit, the filter stage being decoupled from the detector circuit during the transmitting; filtering, using the filter stage upon coupling the filter stage to the detector circuit, the detected voltages in the antenna circuit to provide output variations; and demodulating the output variations to retrieve digital data received from the RFID transponder transmitted in the transponder RF signal.

The foregoing and other embodiments can each optionally include one or more of the following features, alone or in combination. In particular, one embodiment includes all the following features in combination.

For example, the first time interval can correspond to a settling time of the detector circuit.

The coupling and decoupling of the filter stage can be performed with a switch between the filter stage and the detector circuit. The switch can be closed during transmitting the RFID reader RF signal. The switch can be opened after the first time interval.

The method can include varying a resistance of a feedback loop of the filter stage to decrease resistance of the feedback loop during transmissions from the RFID reader. The resistance of the feedback loop can be varied by opening and closing a second switch, the second switch being in the feedback loop. In some embodiments, varying the resistance of the feedback loop includes increasing resistance of the feedback loop after a second time interval since the end of the first time interval, the second time interval corresponding to a settling time of the filter stage.

The method can include monitoring, after emitting the RFID reader RF signal, an input of the filter stage to determine whether the detector circuit has settled, and establishing a length of the first time interval based on a result of the determination whether the detector circuit has settled. The method can include monitoring, after the end of the first interval, an output of the filter stage to determine whether the filter stage has settled, and establish a length of a second time interval based on a result of the determination whether the filter stage has settled. The filter stage can be a first filter stage and can be coupled to a second filter stage, and the method can include monitoring, after the end of the second interval, an output of the second filter stage to determine whether the second filter stage has settled, and establishing a length of a third time interval based on a result of the determination whether the second filter stage has settled.

The RFID reader RF signal can be a signal for writing information to the RFID transponder.

The subject matter described in this specification can be implemented in particular embodiments to realize one or more of the following advantages. Achieving a long maximum reading range naturally leads the designer to implement filter elements in the RFID reader's receiving subsystem which have high gain and high Q factors, and this necessarily results in filter elements that require some finite, nonzero time to recover from very large transient inputs. The receiving subsystem of an RFID reader which is capable of read/write operations must be able to recover quickly enough from writing-induced transients to process a reply from a coupled transponder, and this requirement typically limits the maximum achievable read-only range. The disclosed technologies allow an RFID reader to reduce or eliminate that compromise, by reducing the magnitude of write-induced transients seen by the receiving subsystem. Furthermore, they decrease the recovery time of the RFID reader's receiving subsystem filter elements by controlling the progression of a writing-induced transient through cascaded filter elements.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Described in this specification is a demodulator filter chain that has high gain and narrow bandwidth in order to demodulate weak signals from transponders at extreme range, yet also can recover quickly from large transient inputs it will see while an RFID reader modulates its emitted magnetic field to write commands and data to a transponder.

Figure 1:
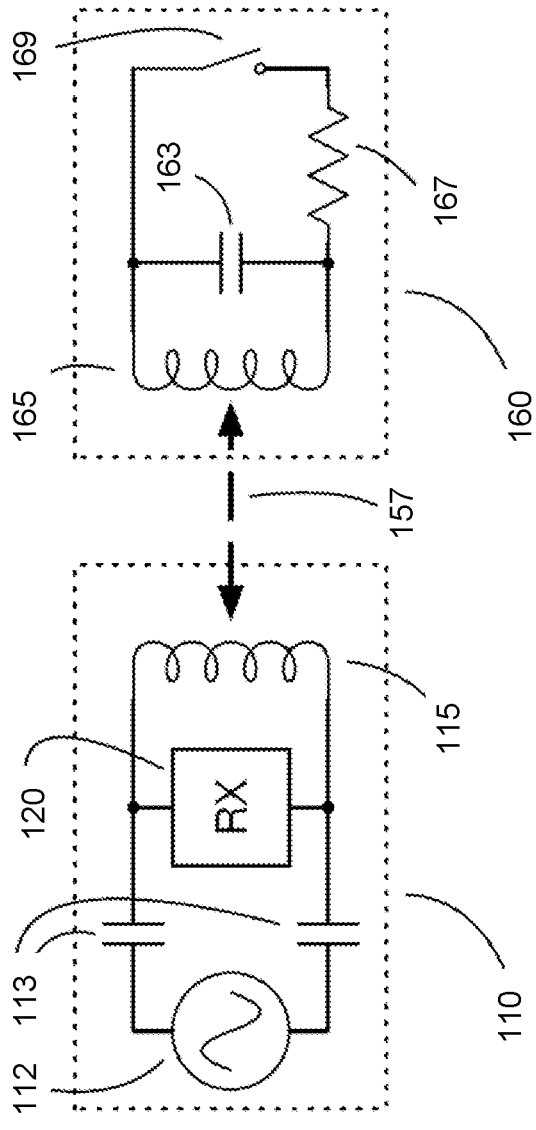
FIG. 1 is a schematic diagram of a passive RFID system.

FIG. 1 shows a schematic diagram of an RFID reader 110 and an RFID transponder 160. The RFID reader 110 includes an AC voltage source 112, which drives a tuned antenna coil circuit that includes one or more capacitors 113 and an antenna coil 115 at or near the tuned antenna coil circuit's natural resonant frequency. Variations of the voltages and/or currents present in the RFID reader 110's antenna coil circuit caused by a coupled transponder 160 are detected and demodulated by a receiving subsystem 120. The RFID transponder 160 includes an antenna coil 165 and capacitor 163 which together form a tuned antenna coil circuit, as well as switching element 169 and resistor 167 which allow the RFID transponder 160 to modulate the impedance which it presents to the RFID reader 110. The respective tuned antenna coil circuits of the RFID reader 110 and the RFID transponder 160 are coupled to each other by loose magnetic coupling 157.

Figure 2:
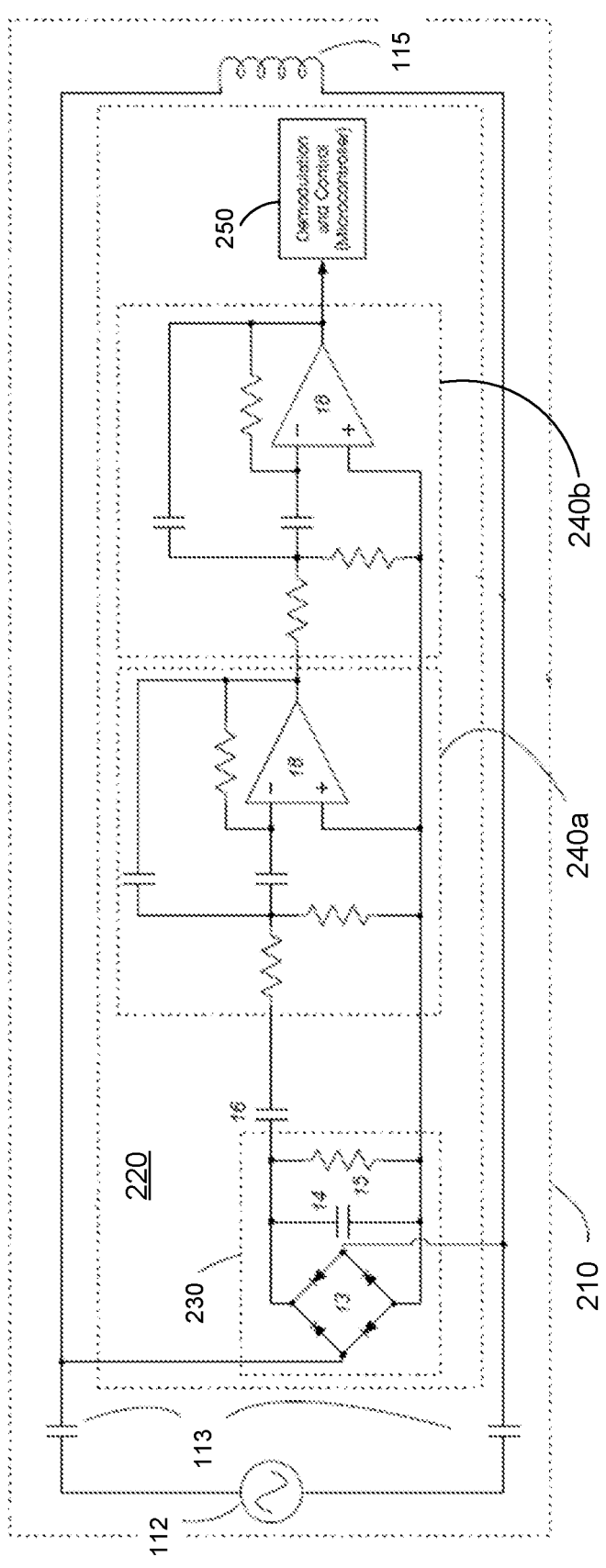
FIG. 2 is a schematic diagram of an RFID reader including a conventional receiving subsystem.

FIG. 2 shows a schematic diagram of a first example of an RFID reader 210 including relevant details of its receiving subsystem 220. Here, the receiving subsystem 220 is implemented in a conventional configuration. The RFID transponder 160's modulation is detected by a detector 230, which includes a bridge rectifier 13, smoothing capacitor 14, and discharge resistor 15. The AC component of the detected signal is coupled through a DC blocking capacitor 16 to one active filter stage 240a or a cascade of two or more active filter stages 240a, 240b, etc. Each active filter stage 240a/b includes an operational amplifier 18 with suitable passive components in its input and feedback circuits to provide the suitable transfer characteristics. From there, the detected and filtered signal passes on to a microcontroller 250 for demodulation and display of the information (e.g., using an electronic display) sent by the RFID transponder, e.g., 160. The microcontroller 250 is further configured to control the RFID reader 210 in general.

Figures 3A, 3B, 3C:
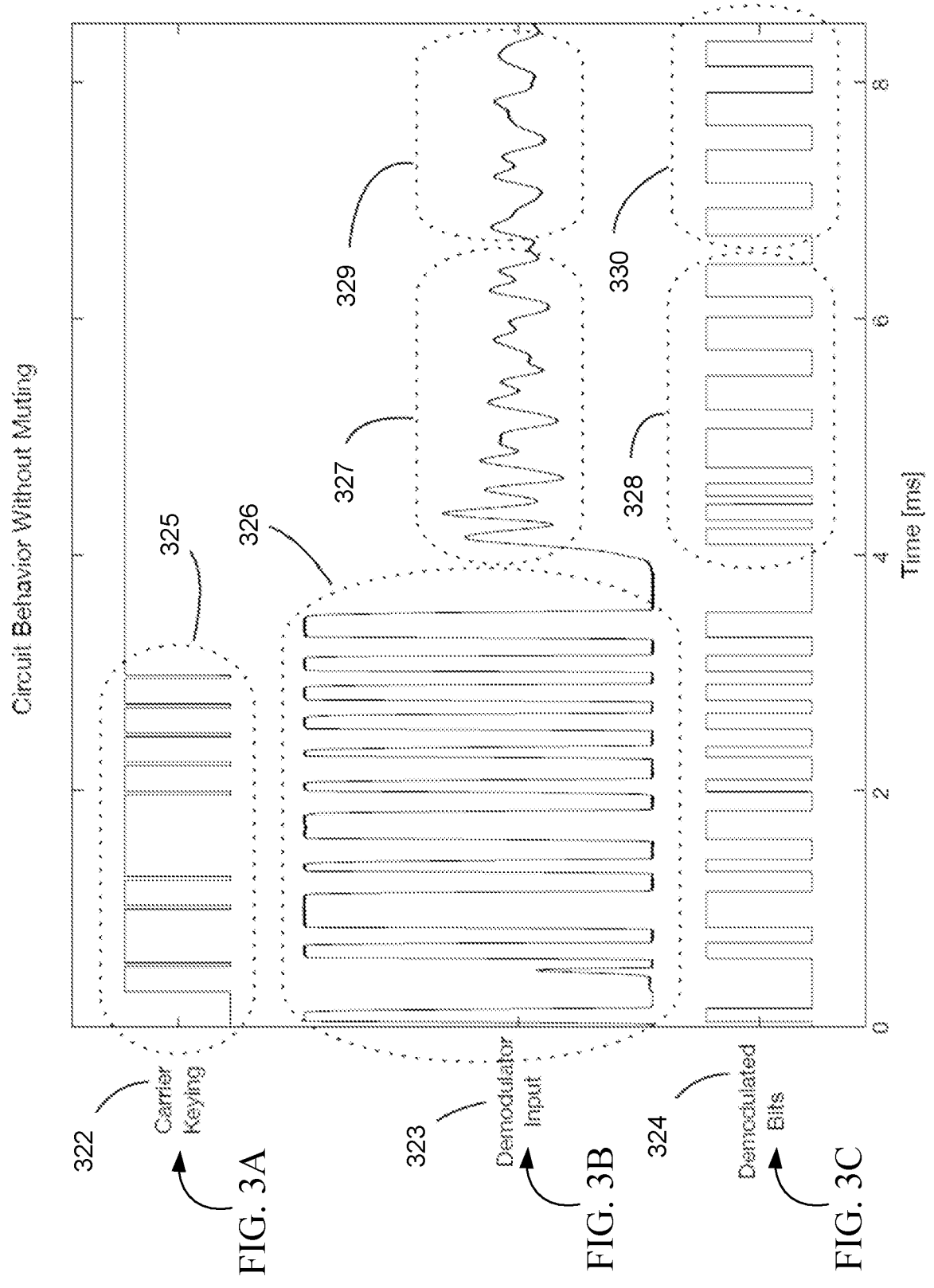
FIGS. 3A-3C show waveforms illustrating circuit behavior corresponding to the RFID reader shown in FIG. 2.

FIGS. 3A-3C illustrate some key waveforms within the RFID reader 210.

FIG. 3A shows an example of a carrier keying waveform 322, which represents the RFID reader 210's modulation of its emitted alternating magnetic field 157. Here, a low level corresponds to the AC voltage source 112 being turned off, while a high level corresponds to a voltage output by the AC voltage source 112 when it is on. In some implementations, the RFID reader 210's modulation of its emitted alternating magnetic field 157 is in a frequency range of 100-400 kHz. For example, a frequency of the RFID reader 210's modulation can be $f_C$=134.2 kHz. The modulated interval of the carrier keying waveform 325 corresponds to the RFID reader 210 sending a command to the RFID transponder, e.g., 160, prior to leaving its carrier steadily on, while the RFID reader 210 listens for a response from the RFID transponder, e.g., 160.

FIG. 3B shows an example of the microcontroller 250's input waveform 323, which represents the output voltage from the last of the active filter stages, which in FIG. 2 is the active filter stage 240b. FIG. 3C shows the demodulated bits waveform 324 which corresponds to the input waveform 323 converted to binary values prior to extraction of clock and data by the microcontroller 250. Digital data can be extracted from the demodulated bits waveform 324. In some embodiments, the amplitude and phase of the output waveform that results from the demodulation (see, e.g., FIG. 3C) are stored and processed as floating point values before final decoding.

Referring now to FIGS. 3A-3C, the modulation of the carrier keying waveform 325 results in saturation of the active filter stages 240a, 240b, which can be clearly seen in the saturated interval of the demodulator input waveform 326. Once the RFID reader 210 stops modulating its emitted carrier, gradual recovery of the active filter stages 240a, 240b results in filter ringing within the ringing interval of the demodulator input waveform 327, with corresponding false transitions and distorted bits in the corrupted interval of the demodulated bits waveform 328. Finally, the RFID reader 210 is able to clearly receive a response from the RFID transponder, e.g., 160, as shown in the normal interval of the demodulator input waveform 329, with a corresponding cleanly demodulated waveform in the properly decoded interval of the demodulated bits waveform 330. Note that the RFID transponder, e.g., 160, transmits its response to the RFID reader 210 as a modulation at a frequency $f_T$ smaller by a factor of N than the frequency $f_C$ of the RFID reader 210's modulation, $$f_T = \frac{f_C}{N}.$$

Here, N can be 2, 8, 10, 32, 64, or other integer values.

In general, the information stored in a transponder can be any type of data (e.g., words, numbers, and other alphanumeric strings), stored digitally. During transmission, the transponder modulates a carrier signal to encode the digital data into an RF waveform. The reader demodulates the received waveform to extract the digital data, retrieving the information stored in the transponder. Because this data was stored digitally on the transponder, it is considered to be digital data, even if it is not restored to its original digital form during or after the demodulation process.

Figure 4:
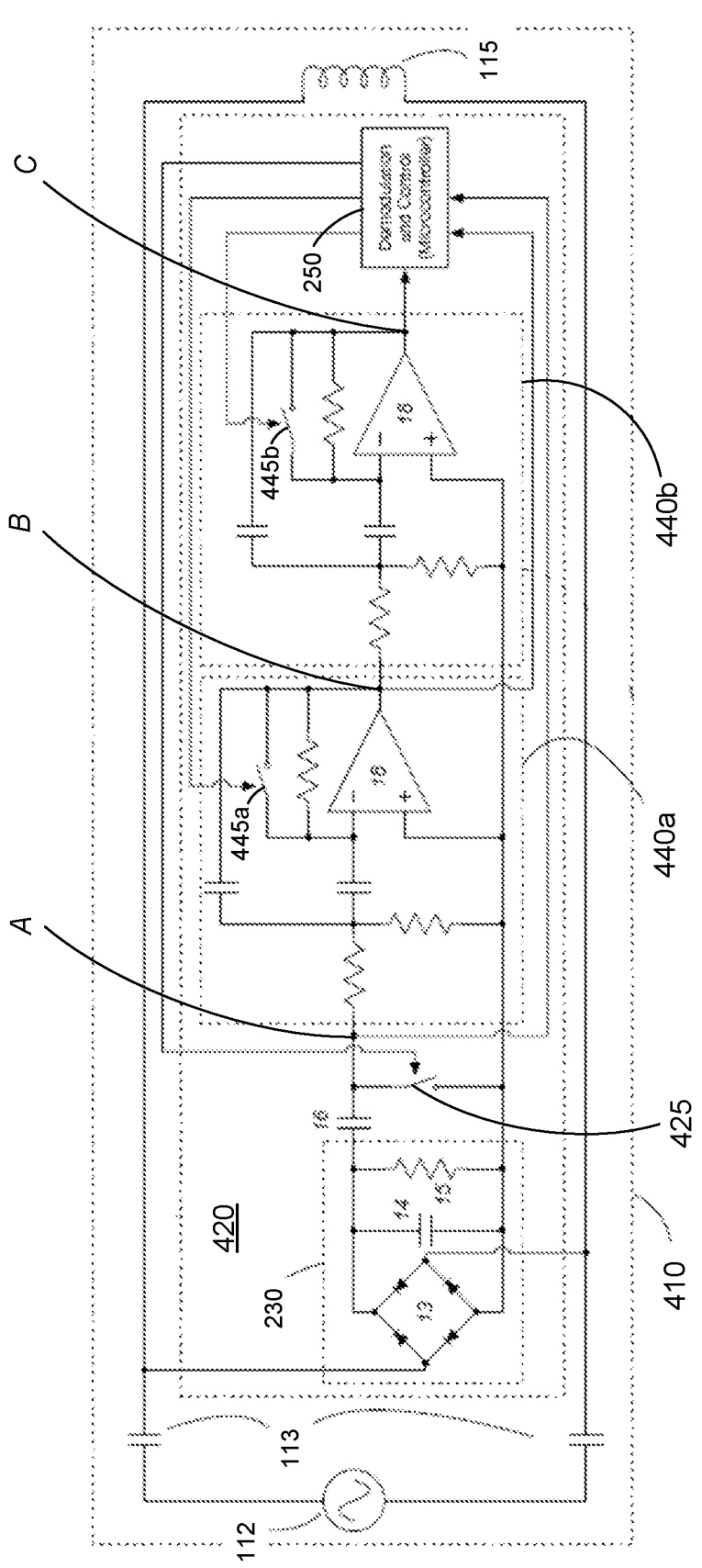
FIG. 4 is a schematic diagram of an RFID reader including a receiving subsystem configured in accordance with the disclosed technologies.

FIG. 4 shows a schematic diagram of a second example of an RFID reader 410 including relevant details of its receiving subsystem 420. Here, the receiving subsystem 420 is implemented in accordance with the disclosed technologies. In addition to the receiving subsystem 420, the RFID reader 410 includes components 112, 113, and 115 that were described above in connection with the RFID reader 210.

In addition to components 230, 16, and 250 that it has in common with the receiving subsystem 220, the receiving subsystem 420 includes a detector-muting switch 425, which will be closed while writing to, and opened while reading from, an RFID transponder, e.g., 160. The detector-muting switch 425 both attenuates strong signals from the detector 230 which are present while writing to the RFID transponder, e.g., 160, and allows the state of charge of the DC blocking capacitor 16 to settle more quickly after transitioning from transponder writing back to transponder reading. Here, the settling time relates to the transient response of the capacitor (or other output device) in response to a sudden variation in input. For example, settling time can refer to the time elapsed from an ideal instantaneous step input to the time at which the capacitor (or other output device) output remains within a certain error band.

In addition to the foregoing components, the RFID reader 420 includes a cascade of active filters 440a, 440b implemented in accordance with the disclosed technologies. Each active filter 440a/b includes an operational amplifier 18 with suitable passive components in its input and feedback circuits like the ones of corresponding filter stage 240a, 240b. Here, a respective filter stage-muting switch 445a/b is connected to the feedback network of each active filter stage 440a/b. The filter stage-muting switch 445a/b will be closed while writing and opened while reading. A respective filter stage-muting switch 445a/b allows each filter stage 440a/b to recover more quickly after transitioning from transponder writing back to transponder reading. The microcontroller 250 optionally monitors intermediate circuit nodes, e.g., nodes A, B, C, in the cascade of active filters 440a, 440b. Optimal recovery time is achieved when all muting switches 425, 445a, 445b are closed during transponder writing, and then are opened in a carefully timed sequence starting at the detector 230 and proceeding through successive active filter stages 440a, 440b. Each switch-opening event shall be carefully timed to coincide with the previous detector stage 230's output, or the previous filter stage 440a, 440b's output, settling to near its quiescent state, thus minimizing the perturbation of each filter stage 440a/b. In some implementations, optimum timing for opening each switching element 425, 445a, 445b is determined analytically through circuit analysis. In some implementations, the optimum timing for opening each switching element 425, 445a, 445b is determined empirically through measurement of the circuit's response to large transient inputs. In implementations like the one shown in FIG. 4, the optimum timing for opening each switching element 425, 445a, 445b is determined as part of a closed-loop system where the microcontroller 250 monitors intermediate circuit nodes, e.g., nodes A, B, C, to determine when to open each switching element 425, 445a, 445b.

Figures 5A, 5B, 5C:
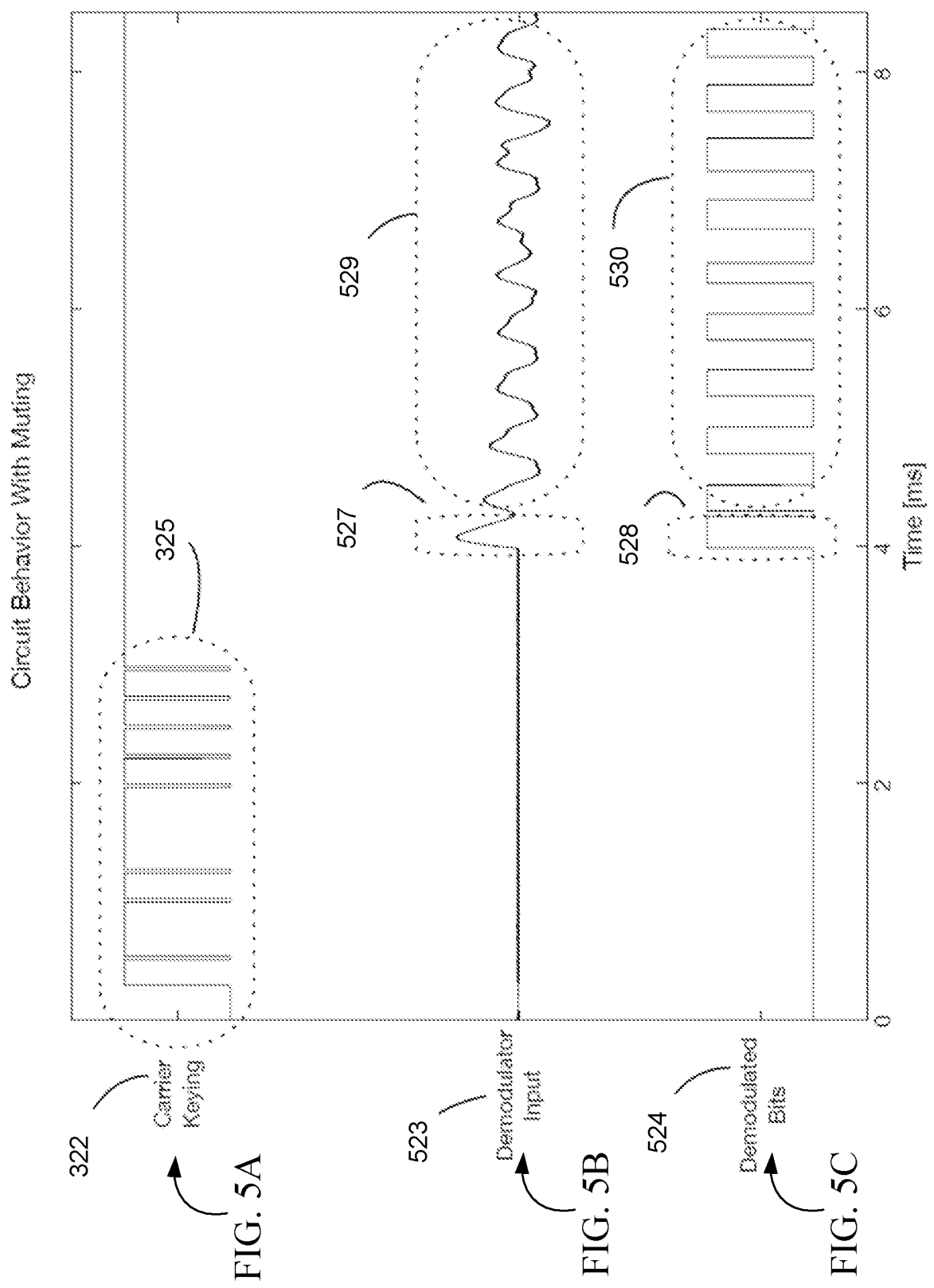
FIGS. 5A-5C show waveforms illustrating circuit behavior corresponding to the RFID reader shown in FIG. 4.

FIGS. 5A-5C illustrate the improved behavior of signals that correspond to the ones shown in FIGS. 3A-3C as they apply to the RFID reader 410. Here, the carrier keying waveform 322 shown in FIG. 5A is the same as the one shown in FIG. 3A. FIG. 5B shows an example of the microprocessor 250's input waveform 523, which represents the output voltage from the last of the active filter stages, which in FIG. 4 is the active filter stage 440b. FIG. 5C shows the demodulated bits waveform 524 which corresponds to the input waveform 523 converted to binary values prior to extraction of clock and data by the microprocessor 250. Notice that the modulated interval of the carrier keying waveform 325, shown in FIG. 5A, does not produce saturation of the active filters 440a, 440b, as shown in FIGS. 5B-5C by flat portions of the waveforms 523, 524. FIGS. 5B-5C also show that the ringing interval of the demodulator input waveform 527 is much shorter, with a correspondingly shorter corrupted interval of the demodulated bits waveform 528, relative to the respective intervals of the waveforms 323, 324. One or more additional properly decoded data bits can now be seen in the normal interval of the demodulator input waveform 529 and the properly decoded interval of the demodulated bits waveform 530.

In summary, this specification describes a demodulator filter chain, which has high gain and narrow bandwidth in order to demodulate weak signals from transponders at extreme range, yet also can recover quickly from large transient inputs it will see while an RFID reader modulates its emitted magnetic field to write commands and data to a transponder.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "microcontroller" refers to data processing hardware and encompasses all kinds of apparatus, devices, and machines for processing data, including by way of example a programmable processor. The microcontroller can also be, or further include, special purpose logic circuitry, e.g., an FPGA (field programmable gate array) or an ASIC (application-specific integrated circuit). The microcontroller can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a LCD (liquid crystal display) or organic light emitting diode (OLED) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Other embodiments are in the following claims.

What is claimed is:

1. Circuitry for communicating with a radio frequency identification (RFID) transponder, the circuitry comprising:
an antenna circuit; and
a receiving subsystem coupled with the antenna circuit, wherein the receiving subsystem comprises:
a detector circuit configured to detect voltages present in the antenna circuit,
a filter stage comprising a feedback loop, the filter stage configured to output variations of the detected voltages that are caused by transmissions to and from the RFID transponder,
a microcontroller configured to demodulate the output variations as digital data received from the RFID transponder as part of the communications, and
a detector muting switch, that includes a pair of cascaded transistors, and that is disposed between the detector circuit and the filter stage to decouple the filter stage from the detector circuit when the detector muting switch is closed, and couple the filter stage with the detector circuit when the detector muting switch is open,
wherein the microcontroller is configured to:
maintain the detector muting switch closed during transmissions to the RFID transponder,
monitor, after an end of transmissions to the RFID transponder, an input of the filter stage to determine whether the detector circuit has settled, and establish a length of a first time interval based on a result of the determination whether the detector circuit has settled, and
monitor, after the end of the first time interval, an output of the filter stage to determine whether the filter stage has settled, and establish a length of a second time interval based on a result of the determination whether the filter stage has settled.

2. The circuitry of claim 1, further comprising:
a second switch, that includes a pair of cascaded transistors, and that is disposed as part of a feedback loop of the filter stage to decrease resistance of the feedback loop when the second switch is closed, and to increase the resistance of the feedback loop when the second switch is open.

3. The circuitry of claim 2, wherein the microcontroller is further configured to:
maintain the second switch closed during the transmissions to the RFID transponder,
open the detector muting switch after the first time interval since the end of the transmissions to the RFID transponder, the first time interval corresponding to a settling time of the detector circuit, and
open the second switch after the second time interval since the end of the first time interval, the second time interval corresponding to a settling time of the filter stage.

4. The circuitry of claim 3, wherein the microcontroller is configured to open the detector muting switch after a first time interval based on an optimum timing determined by analytical circuit analysis.

5. The circuitry of claim 4, wherein opening the detector muting switch based on the optimum timing determined by the analytical circuit analysis comprises performing real-time circuit analysis.

6. The circuitry of claim 1, wherein the filter stage comprises an operational amplifier.

7. The circuitry of claim 2, wherein the second switch is connected to short the feedback loop of an operational amplifier, when the second switch is closed.

8. The circuitry of claim 1, wherein the filter stage comprises a filter stage-muting switch.

9. The circuitry of claim 2, wherein the microcontroller is configured to open the detector muting switch and the second switch sequentially.

10. The circuitry of claim 2, wherein the filter stage is a first filter stage and the receiving subsystem further comprises:
a second filter stage disposed between the first filter stage and the microcontroller,
a third switch that includes a pair of cascaded transistors, and that is disposed as part of the feedback loop of the second filter stage.

11. The circuitry of claim 10, wherein the microcontroller is further configured to open the third switch after a third time interval since the end of the second time interval, the third time interval corresponding to a settling time of the second filter stage.

12. The circuitry of claim 10, wherein the second filter stage comprises an operational amplifier, and the third switch is connected to short the feedback loop of the operational amplifier, when the third switch is closed.

13. A method for communicating with a radio frequency identification (RFID) transponder, the method comprising:

transmitting an RFID reader RF signal from an RFID reader;

receiving, at an antenna circuit of the RFID reader, a transponder RF signal transmitted by the RFID transponder in response to the RFID reader RF signal;

detecting, using a detector circuit of the RFID reader, voltages present in the antenna circuit during the transmitting and the receiving;

after a first time interval since an end of transmitting the RFID reader RF signal, coupling a filter stage to the detector circuit, the filter stage being decoupled from the detector circuit during the transmitting;

filtering, using the filter stage upon coupling the filter stage to the detector circuit, the detected voltages in the antenna circuit to provide output variations;

varying a resistance of a feedback loop of the filter stage to decrease resistance of the feedback loop during transmissions from the RFID reader and increase resistance of the feedback loop after a second time interval since the end of the first time interval, the second time interval corresponding to a settling time of the filter stage;

demodulating the output variations to provide digital data received from the RFID transponder transmitted in the transponder RF signal; and monitoring, after emitting the RFID reader RF signal, an input of the filter stage to determine whether the detector circuit has settled, and establishing a length of the first time interval based on a result of the determination whether the detector circuit has settled.

14. The method of claim 13, wherein the first time interval corresponds to a settling time of the detector circuit.

15. The method of claim 13, wherein the coupling and decoupling of the filter stage is performed with a switch between the filter stage and the detector circuit.

16. The method of claim 15, wherein the switch is closed during transmitting the RFID reader RF signal.

17. The method of claim 15, wherein the switch is opened after the first time interval.

18. The method of claim 13, wherein the RFID reader RF signal is a signal for writing information to the RFID transponder.

* * * * *